United States Patent
Hamdi et al.

(10) Patent No.: US 9,077,658 B2
(45) Date of Patent: *Jul. 7, 2015

(54) FLOW-BASED NETWORK SWITCHING SYSTEM

(71) Applicant: Dell Products L.P., Round Rock, TX (US)

(72) Inventors: Rabah S. Hamdi, Spring, TX (US); Saikrishna M. Kotha, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,545

(22) Filed: Sep. 15, 2014

(65) Prior Publication Data

US 2015/0003248 A1 Jan. 1, 2015

Related U.S. Application Data

(63) Continuation of application No. 13/543,019, filed on Jul. 6, 2012, now Pat. No. 8,837,288.

(51) Int. Cl.
*H04L 12/24* (2006.01)
*H04L 12/721* (2013.01)
*H04L 12/801* (2013.01)
*H04L 12/725* (2013.01)
*H04L 12/861* (2013.01)
*H04L 12/741* (2013.01)

(52) U.S. Cl.
CPC ............... *H04L 45/38* (2013.01); *H04L 47/10* (2013.01); *H04L 45/306* (2013.01); *H04L 45/54* (2013.01); *H04L 47/193* (2013.01); *H04L 49/90* (2013.01)

(58) Field of Classification Search
CPC .............................. H04L 47/10; H04L 49/602
USPC .................... 370/351–360, 400, 901; 375/328
See application file for complete search history.

(56) References Cited

U.S. PATENT DOCUMENTS 8,325,713 B2 12/2012 Chawla et al.
8,325,733 B2 12/2012 Harel et al.

OTHER PUBLICATIONS

"OpenFlow Switch Specification," Version 1.0.0 (Wire Protocol 0x01), Brandon Heller, brandonh@stanford.edu, Dec. 31, 2009, pp. 1-42.

*Primary Examiner* — Dang Ton
*Assistant Examiner* — Mewale Ambaye
(74) *Attorney, Agent, or Firm* — Haynes and Boone, LLP

(57) ABSTRACT

A flow-based network switching system includes a memory having a flow table and a packet processor coupled to the memory. The packet processor includes a user-programmable flow-based rule storage that includes a plurality of flow-based rules. A flow-based handler and session manager in the packet processor is operable to retrieve application layer metadata from a first packet received over a network, determine a first flow session associated with the first packet using the application layer metadata from the first packet and the flow table, and retrieve at least one of the plurality of flow-based rules from the programmable flow-based rule storage using the application layer metadata from the first packet. A flow-based rule processing engine in the packet processor is operable to apply the at least one flow-based rule to the first packet. Packets with applied flow-based rules are forwarded through the network.

20 Claims, 4 Drawing Sheets

FLOW-BASED NETWORK SWITCHING SYSTEM

CROSS-REFERENCE TO RELATED APPLICATIONS

This application is a Continuation of U.S. patent application Ser. No. 13/543,019 filed on Jul. 6, 2012, entitled "Flow-Based Network Switching System," the disclosure of which is incorporated herein by reference.

BACKGROUND

The present disclosure relates generally to information handling systems (IHS's), and more particularly to a flow-based network switching IHS for transferring information between IHS's.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHS's may be coupled together to form networks in order to share information. Those networks typically include network switches (which are also IHS's) that are used to transfer information from one IHS to another. Conventional network switching systems are designed to address the needs for high bandwidth of packet switching and forwarding using a set of predefined metadata located within the destination fields of the frame headers in the packets. In limiting themselves to the use of this predefined metadata, such conventional systems compromise the utilization of newly developed technologies such as, for example, real-time web based content aware applications and services. Thus, current network switching systems are limited by rigid packet processing logic and inflexibility, which requires system redesign as network protocols develop and as additional feature enhancements of network applications and services emerge.

For example, a typical packet switching system includes ingress and egress processing. Once a packet is received, parsing and look-up of predefined metadata in the destination fields of the packet header is conducted to find a matching entry in a Ternary Content Addressable memory (TCAM) table. This search of the destination fields in the packet header is limited to network layer 2 metadata (e.g., a Media Access Control (MAC) destination address, a Virtual Local Area Network (VLAN) identifier, etc.) and network layer 3 metadata (e.g., an Internet Protocol (IP) destination address), and the packet metadata may be stored in the TCAM table for future searches and look-ups. In some embodiments, the packet switching system may include a set of predefined access rules and policies that are applied to every packet in the system based on the network layer 2 and 3 metadata in the packet header. Packet payloads are stored in queues in memory and their packet headers may be subject to modifications (e.g., the destination MAC address, the destination IP address, or customer VLAN's may be modified) in the forwarding path prior to egress of the system.

Such conventional packet switching systems suffer from a fixed and rigid processing design, and cannot scale in response to additional feature enhancements and/or new technologies. They are suited for traditional switching logic that is based on the predefined metadata in destination fields of the packet headers, but do not allow for more granular packet processing. Accordingly, it would be desirable to provide an improved network switching system.

SUMMARY

According to one embodiment, a flow-based network switching system includes a memory including a flow table; and a packet processor coupled to the memory, wherein the packet processor includes: a programmable flow-based rule storage that includes a plurality of flow-based rules; a flow-based handler and session manager that is operable to retrieve application layer metadata from a first packet, determine a first flow session associated with the first packet using the application layer metadata from the first packet and the flow table, and retrieve at least one of the plurality of flow-based rules from the programmable flow-based rule storage using the application layer metadata from the first packet; and a flow-based rule processing engine that is operable to apply associated flow-based rule sets to appropriate flows.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
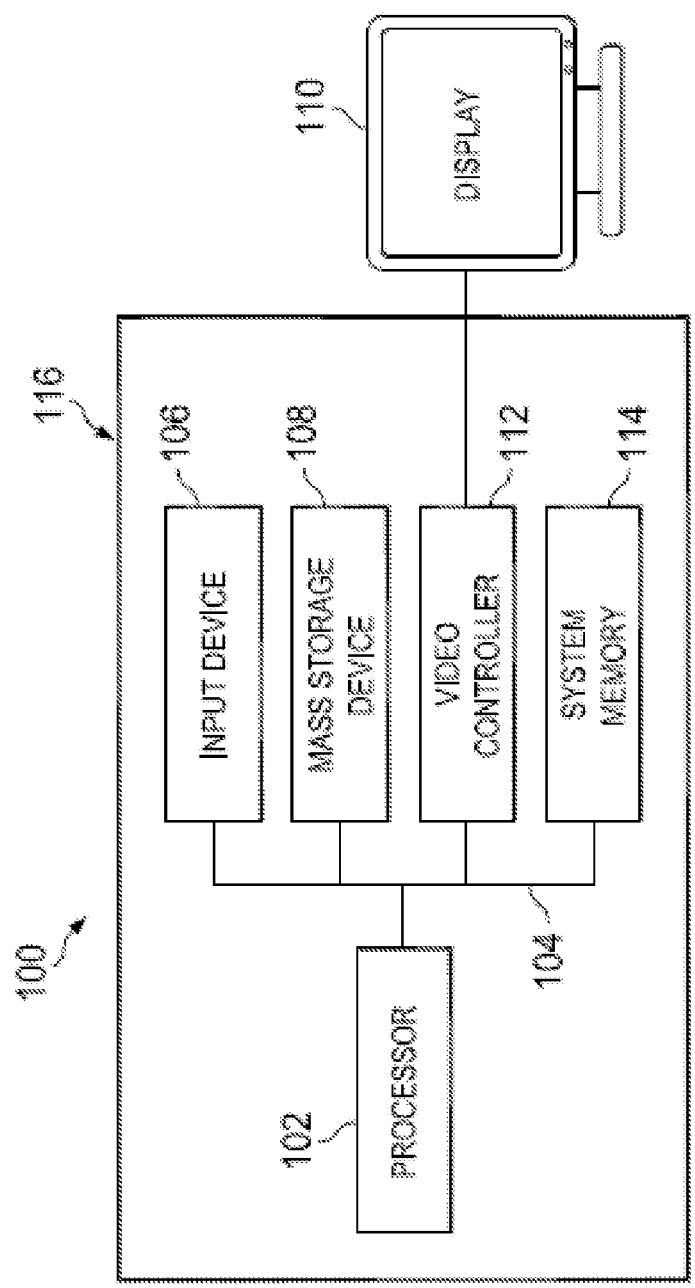
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
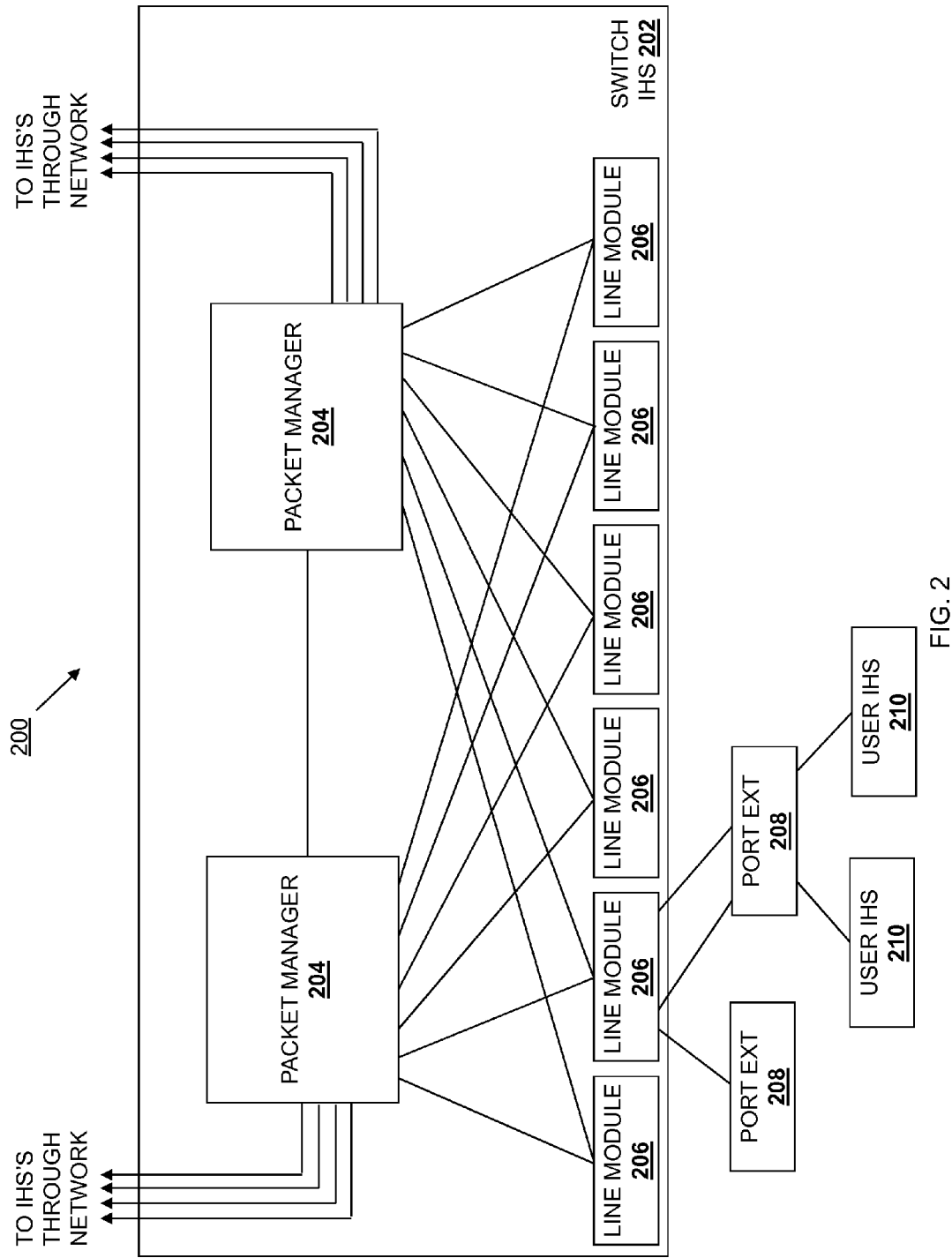
FIG. 2 is a schematic view illustrating an embodiment of an information handling system including a plurality of components that each may include the network switching system of the present disclosure.

Referring now to FIG. 2, an embodiment of an IHS network 200 is illustrated. The embodiment of the IHS network 200 illustrated in FIG. 2 is an example of a flow-based switching system including optimized fabric port extenders that may be tailored for flow-based switching. However, the example illustrated in FIG. 2 is simply one example of an IHS network that provides flow-based network switching system according to the teachings of the present disclosure, and one of skill in the art will recognize that the teachings below may be applied to a variety of different devices and systems without departing from the scope of the present disclosure. The IHS network 200 includes a switch IHS 202 having a plurality of packet managers 204 each connected to a plurality of line modules 206. As illustrated for one of the line modules 206, any of the line modules 206 may be connected to a plurality of port extenders 208. As illustrated for one of the port extenders 208, any of the port extenders 208 may be coupled to a plurality of user IHS's 210. As would be understood by one of skill in the art, the switch IHS may be connected to a core switch or router (not illustrated) that is further connected the Internet, a datacenter, etc.

Figure 3:
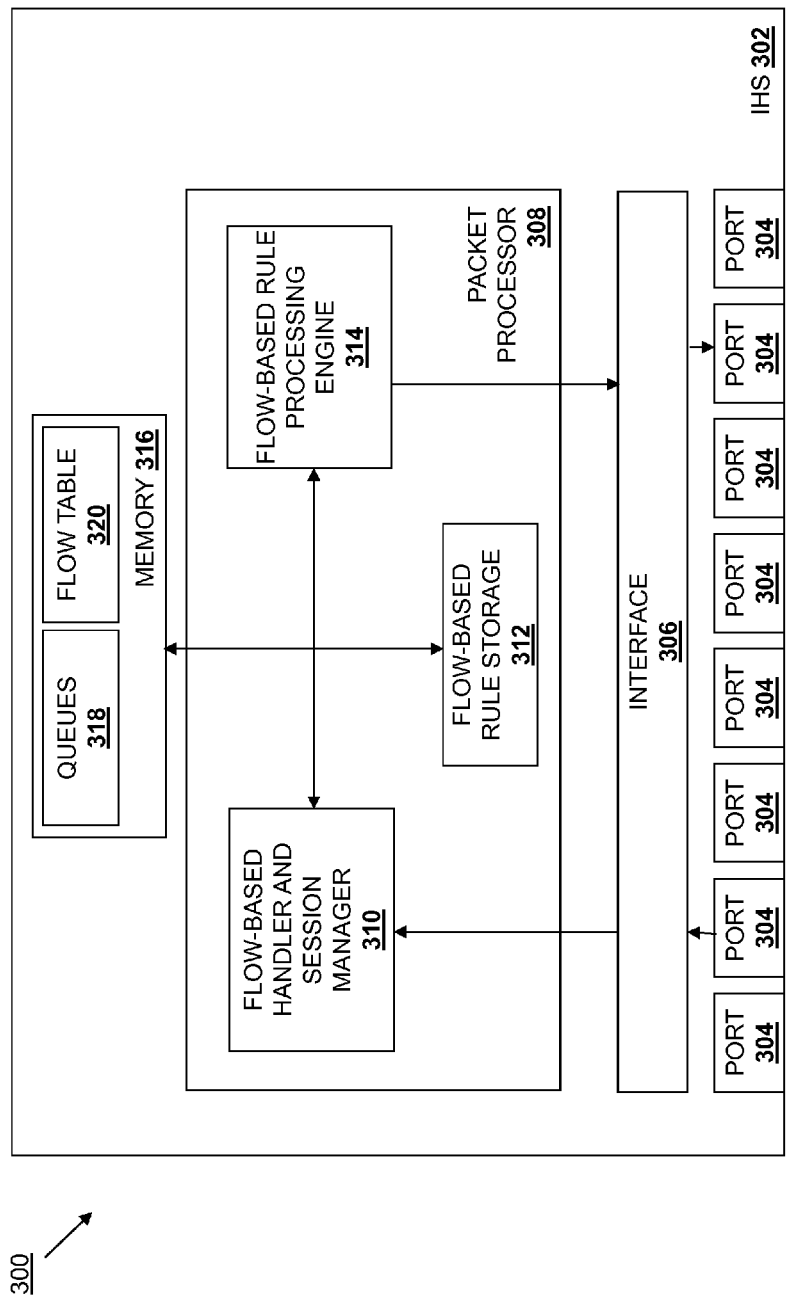
FIG. 3 is a schematic view illustrating an embodiment of a network switching system that may be used in the information handling system network of FIG. 2.

Referring now to FIG. 3, an embodiment of a flow-based network switching system 300 is illustrated. The flow-based network switching system 300 includes an IHS 302. In an embodiment, the IHS 302 may be the IHS 100, described above with reference to FIG. 1, may be included in the packet managers 204, the line modules 206, or the port extenders 208, described above with reference to FIG. 2, and/or may be provided in a variety of other network components known in the art. The IHS 302 includes a plurality of ports 304 that are each coupled to an interface 306 that may include, for example, a Media Interface with physical (PHY) and link (MAC) layers. The interface 306 couples the ports 304 to a packet processor 308 which, in an embodiment, may be a flow-based packet processing chip such as, for example, a chip that has been optimized to inspect and classify application layer packet information (as opposed to convention packet processing chips that process packets based on layer-2 and layer-3 data), as discussed further below. The packet processor 308 includes a flow-based handler and session manager 310, a flow-based rule processing engine 314, and a flow-based rule storage 312. Each of the flow-based handler and session manager 310 and the flow-based rule processing engine 314 are coupled to the interface 306. The flow-based handler and session manager 310, the flow-based rule processing engine 314, and the flow-based rule storage 312 are coupled to each other and to a memory 316. The flow-based rule storage 312 is configurable and programmable by a user to include a variety of flow-based rules, discussed in further detail below. Furthermore, the flow-based rule storage 312 may include one or more default rules that may be applied to packets that are not associated with any user defined flow set rules, discussed in further detail below. In an embodiment, the memory 316 is external to the packet processor 308 and coupled to at least one core of the packet processor 308 through a high speed memory bus. The memory 316 includes a plurality of queues 318 and a flow table 320. The flow table 320 may include a plurality of flow match rules, discussed in further detail below. While not illustrated in detail, one of skill in the art will recognize that the IHS 302 may include one or more non-transitory, computer-readable mediums that are coupled to the packet processor 308 and include instructions that, when executed by the packet processor 308, cause the packet processor 308 to provide the functions of the flow-based handler and session manager 310 and the flow-based rule processing engine 314, discussed in further detail below.

As discussed in further detail below, the packet processor 308 is operable to perform packet flow metadata search, inspection, collection, and processing by retrieving metadata from the packet flow header pertaining to application flow match requirements (e.g., signatures, data types, application policies, forwarding, modification rules, and/or a variety of other application flow match requirements known in the art.) Furthermore, flow-based rules to be applied to packets are programmable by a user and configurable based on application requirements and policies.

Figure 4:
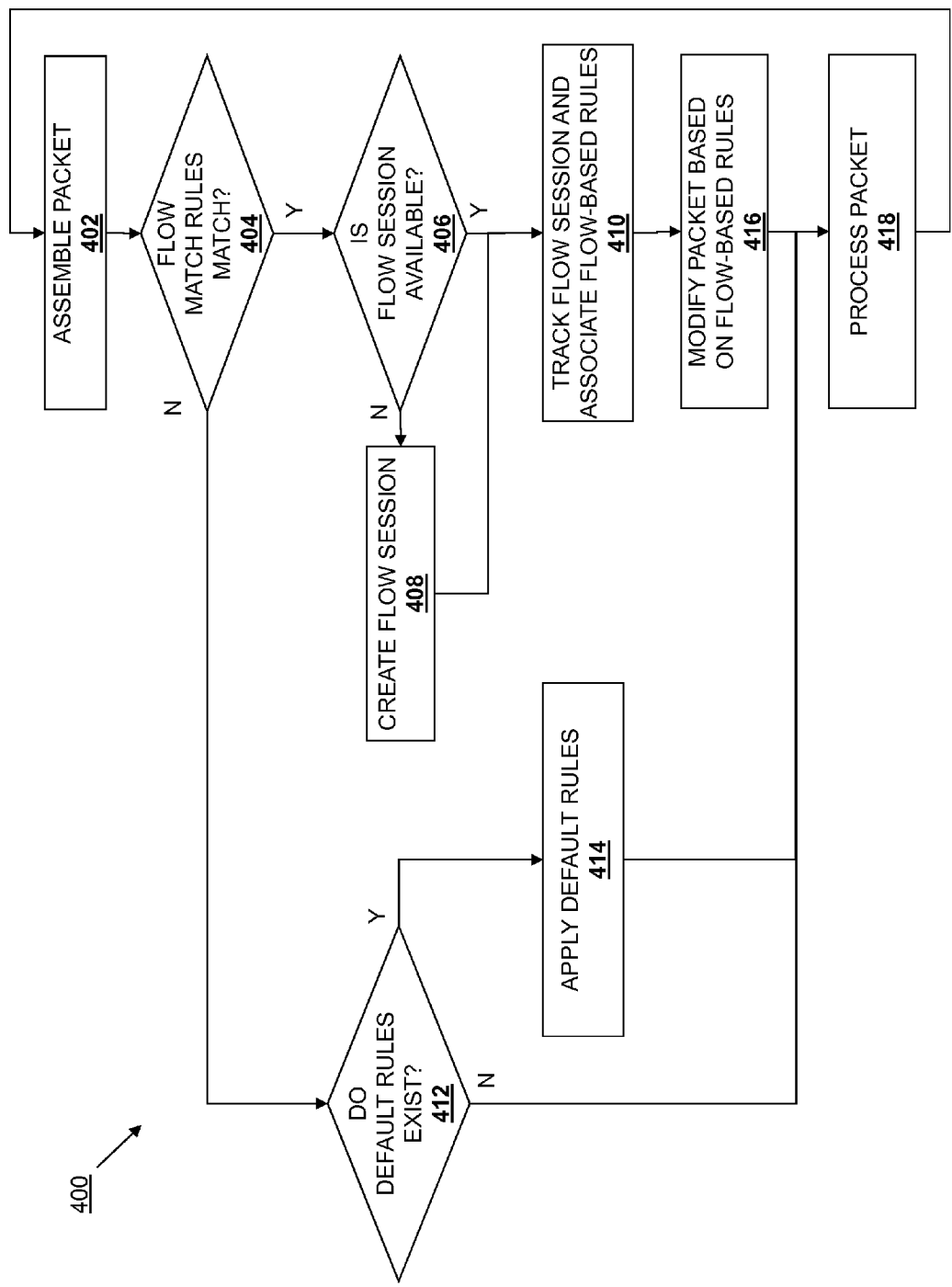
FIG. 4 is a flow chart illustrating an embodiment of a method for network switching.

Referring now to FIGS. 3 and 4, an embodiment of a method 400 for network switching is illustrated. The method 400 may be performed by the flow-based network switching system 300 as illustrated in FIG. 3, as implemented in the IHS network 200 of FIG. 2 (e.g., in the packet managers 204, line modules 206, and/or port extenders 208) and/or in a variety of other networking scenarios known in the art. The method 400 and flow-based architecture illustrated in FIG. 3 may be leveraged for access network designs, aggregation network designs, and a variety of other network designs known in the art. The flow based processing performed in the method 400 addresses next-generation network architecture that requires intensive and high performance packet processing of content aware applications and services at line rate speeds, while providing programmable deep packet inspection and classification of complex data types of flow-based services designed into emerging technologies (e.g., the OpenFlow protocol, L4-L7 protocols, security and filtering, traffic management, load balancing, rate shaping, and/or a variety of other emerging technologies known in the art.)

The method 400 begins at block 402 where a packet is assembled. As is known in the art, packets may be sent from one or more IHS's in a network to the IHS 302 (e.g., a first IHS may send a first set of packets to the IHS 302 over the network, a second IHS may send a second set of packets to the IHS 302 over the network, and so on.) In an embodiment, packet data ingresses the IHS 302 through one of the ports 304. That packet data passes through the interface 306 and to the flow-based handler and session manager 310 in the packet processor 308. The flow-based handler and session manager 310 receives the packet data and assembles the packet data into packets for further processing. Thus, the flow-based handler and session manager 310 may receive a first set of packet data and assemble a first packet from that packet data, receive a second set of packet data and assemble a second packet from that packet data, receive a third set of packet data and assemble a third packet from that packet data, and so on. As packets are assembled, they may be stored in the queues 318 of the memory 316 before or while being processed according the method 400, discussed above.

The method 400 then proceeds to decision block 404 where it is determined whether the packet includes metadata that matches flow match rules. Subsequent to assembling a packet in block 402 of the method 400, the flow-based handler and session manager 310 may perform a deep inspection on the packet header. For example, the flow-based handler and session manager 310 may inspect the packet header for layer 4 (transport layer) metadata (e.g., TCP, UDP, SCTP, DCCP, and/or SPX data), layer 5 (session layer) metadata (e.g., Named pipe, NetBIOS, SAP, PPTP, and/or SOCKS data), layer 6 (presentation layer) metadata (e.g., MIME, XDR, TLS, and/or SSL data), and/or layer 7 (application layer) metadata (e.g., NNTP, SIP SSI, DNS, FTP, Gopher, HTTP, NFS, NTP, SMPP, SMTP, SNMP, Telnet, DHCP, Netconf, RTP, SPDY, and/or other application layer metadata known in the art). In one example, an application may use Session Initiation Protocol (SIP) to communicate with other entities in the network, and at decision block 404, the flow-based handler and session manager 310 will retrieve SIP application layer data from the packet header. Using the metadata from the deep inspection of the packet, the flow-based handler and session manager 310 then compares that metadata to flow match rules that are stored in the flow table 320 to determine whether the packet assembled in block 402 of the method 400 matches a flow session that is associated with one or more of the flow match rules that are stored in the flow table 320. The flow-based handler and session manager 310 may employ a variety of algorithms to determine whether the metadata from the packet is associated with a flow session such as, for example, retrieving application layer metadata such as signatures (e.g., URLs) from the packet header and matching that application layer metadata with flow match rule data for a flow session in the flow table. As discussed in further detail below, when the first packet associated with a particular flow is received, the flow-based handler and session manager 310 creates a flow session in response to determining that the packet metadata matches flow match rule data that is stored in the flow table 320 and that pertains to configurations and management associated with that flow session. Then, further packets associated with that particular flow session can then be determined to be part of that flow session by matching metadata retrieved through the deep packet inspection discussed above with the flow match rules data in the flow table 320.

In an embodiment of decision block 404, using the metadata retrieved through the deep packet inspection discussed above, the flow-based handler and session manager 310 may access the flow table 320 to determine whether any flow match rules exist for that packet. In one example, a user may have created a flow-based rule, discussed in further detail below, for video conferencing (e.g., the rule may cause the packet to be redirected to a link provided for video conferencing traffic). When a packet is received and the deep packet inspection retrieves application layer metadata that includes a signature related to a video conferencing application, the flow-based handler and session manager 310 will determine that signature matches a flow match rule in the flow table 320. A user of the flow-based network switching system 300 may pre-configure and program flow-based rules for packets into the flow-based rule storage 312 for particular flows, and flow match rules associated with those particular flows are then stored in the flow table 320 and used to match packets to their appropriate flows such that the user defined flow-based rules may be applied.

If, at decision block 404, the flow-based handler and session manager 310 determines that flow match rules match the packet metadata, the method 400 then proceeds to decision block 406 where the flow-based handler and session manager 310 determines whether a flow session is available for the packet. If a flow session is not available, the method proceeds to block 408 where a flow session is created. In an embodiment, the flow-based handler and session manager 310 creates a new flow session for the flow that is associated with the packet that matched the flow match rules at decision block 404 but for which no flow session was found to exist at decision block 406. In an embodiment, the creation of a new flow session includes the generation and storage of a new flow session identification (e.g., in the flow table 320 or other storage.) In an embodiment, the flow-based handler and session manager 310 creates the flow session in the flow table 320 in the memory 316 that corresponds to associated flow-match rules and flow action rules sets to provide flow session data that is associated with the new flow session (e.g., in the flow table 320.) Thus, in some embodiments, a first flow session may be created in response to receiving a packet that includes metadata that matches any flow match rules in the flow table 320 but for which no flow session currently exists, and that first flow session may be used to track all subsequent packets that include metadata that indicates that they are part of the same flow. Furthermore, a second flow session may be created in response to receiving a packet that includes metadata that matches any flow match rules in the flow table 320 but for which no flow session currently exists, and that second flow session may be used for subsequent packets that include metadata that indicates that they are part of the same flow. One of skill in the art will recognize that any number of flow sessions may be created as packets associated with different flows are received by the flow-based handler and session manager 310. If, at decision block 406, the flow-based handler and session manager 310 determines that a flow session is available for the packet (e.g., as previously created in block 408 during a previous invocation of the method 400), the method 400 proceeds to block 410, discussed in further detail below.

If, at decision block 404, the flow-based handler and session manager 310 determines that the packet does not include metadata that matches flow match rules in the flow table 320, the method 400 proceeds to decision block 412 where the flow-based handler and session manager 310 determines whether any default rules exist for the packet. If default rules exist for the packet, the method 400 proceeds to block 414 where the flow-based handler and session manager 310 may retrieve one or more default rules from a storage and apply the one or more default rules to the packet. In an embodiment, default rules may be applied to simply forward packets, to apply more complex modification and forwarding logic to the packets, drop the packets, restrict traffic including those packets, etc. The method 400 then proceeds to block 418, discussed in further detail below. If no default rules are determined to exist for the packet at decision block 412, the method 400 also proceeds to block 418.

Following either decision block 406 or block 408, the method 400 proceeds to block 410 where the flow session is tracked and flow-based rules are associated with the packet. Once the flow session is created at block 408, the flow-based handler and session manager 310 may match assembled packets to the flow session as discussed above with reference to decision blocks 404 and 406. Furthermore, the flow-based handler and session manager 310 may monitor and maintain all active and open flow sessions. The flow-based handler and session manager 310 will continue to match packets to flow sessions until a flow session stop indicator is received. For example, when a flow has finished, the final packet associated with that flow may include a flow session stop indicator that indicates that that flow has ended and causes the flow-based handler and session manager 310 to deactivate the associated flow session in the flow table 320 in the memory 316. In one example, flow session termination may be detected using application layer metadata (e.g. SIP application layer metadata), transport layer metadata (TCP or UDP transport layer transport layer data), link layer metadata (e.g., in the absence of data being received for a predetermined amount of time), etc. Furthermore, at block 410, for packets associated with active flow sessions, the flow-based handler and session manager 310 uses the metadata retrieved through the deep packet inspection discussed above to retrieve one or more flow-based rules from the flow-based rule storage 312 and associates the one or more flow-based rules with the packet. For example, using the example including the user-created rule for video conferencing discussed above, the user-created rule that provides for the redirection of the packet to a link provided for video conferencing is associated with the packet. Flow-based rules associated with a packet may be provided to the flow-based rule processing engine 314 at block 410.

In an embodiment, the flow-based rules retrieved and associated with the packet in block 410 may include a security rule such as, for example, a rule for dropping packets belonging to a flow session that is accessing unauthorized websites. In an embodiment, the flow-based rules retrieved and associated with the packet in block 410 may include a load balancing rule such as, for example, a rule for directing packets in a flow session to a destination based on a network traffic design. In an embodiment, the flow-based rules retrieved and associated with the packet in block 410 may include a traffic shaping rule such as, for example, a rule for directing packets belonging to a flow session to maintain traffic speeds over one or more traffic interfaces. In an embodiment, the flow-based rules retrieved and associated with the packet in block 410 may include a redirection rule such as, for example, a rule for directing packets in a flow session to another network, application, etc. In an embodiment, the flow-based rules retrieved and associated with the packet in block 410 may include a modification rule such as, for an example, a rule to modify a packet belonging to a flow session based on any user requirement. In an embodiment, the flow-based rules retrieved and associated with the packet in block 410 may include a statistical rule such as, for example, a rule to direct packets in a flow session to maintain traffic statistics as desired. In an embodiment, the flow-based rules retrieved and associated with the packet in block 410 may include a packet header rewrite rule such as, for example, a rule to rewrite the destination of packets in a flow session as desired by the user.

The method 400 then proceeds to block 416 where the packet is modified using the flow-based rules. The flow-based rule processing engine 314 uses the flow-based rules associated with the packet in block 410 (or the default rules retrieved for packets not associated with current flow sessions) to modify the packet. For example, the packet may be modified according to the rules described above by changing any information in the packet header based on the requirements of the flow-based rule.

Following decision block 412, block 414, or block 416, the method 400 then proceeds to block 418 where the packet is processed. Thus, upon determining that no default rules exist for the packet in decision block 412, upon applying one or more default rules at block 414, or upon modifying the packet using the flow-based rules in block 416, the flow-based rule processing engine 314 then processes the packet. In an embodiment, processing the packet may include performing flow scheduling (e.g., queueing the packet), forwarding the packet through the interface 306 such that the packet egresses the IHS 302 via one of the ports 304, dropping the packet, and/or a variety of other packet processing actions known in the art. In an embodiment, when packets associated with a flow session are scheduled for redirection and forwarding, the flow-based rule processing engine 314 also enforces the associated rules and policies on the packets as they progress into the egress pipeline of the IHS 302. Flow-based processing rules and policies may include conditional logic-based actions, byte swaps, field rewrite, increment/decrement operations, header insertion/deletion for tunnel creation/termination, traffic management, and load balancing.

One of the many benefits provided by the flow-based network switching system 300 is that, unlike traditional packet processing where multiple read/write operations are required for packet processing and forwarding, the flow-based network switching system 300 optimizes management and operation of the memory 316 by needing only a single write operation of a flow to the memory 316, and as flows are scheduled for forwarding and redirection, only a single read operation is needed from the queues 318. Conventional systems require multiple reads and writes to classify, process, and forward a packet. The system of the present disclosure receives a packet and performs one write of the packet into the queue after classification, when the packet is scheduled to egress the switch, one read is performed by the rule processing engine, followed by applying the rule to the packet and sending the packet to the destination.

The method 400 then returns to block 402 to where packets are assembled and the flow-based packet processing is repeated. One of skill in the art will recognize that the method 400 may be used by the flow-based network switching system to process, in parallel, sets of packets associated with different flow sessions. For example, a first set of packets associated with a first flow may be received and assembled, with a first flow session created upon receiving the first packet in the first set of packets, followed by modification of the packets in the first set of packets using the flow-based rules as discussed above before forwarding the packets in the first set of packets through the network. Concurrently, a second set of packets associated with a second flow may be received and assembled, with a second flow session created upon receiving the first packet in the second set of packets, followed by modification of the packets in the second set of packets using the flow-based rules as discussed above before forwarding the packets in the second set of packets through the network. This may occur for any number of flows occurring within the IHS network.

Thus, a flow-based network switching system and method have been described that provide many advantages over conventional network switching systems known in the art. For example, the flow-based network switching system and method of the present disclosure provide for application level flow-based inspection and classification capability, real-time flexible and programmable forwarding and switching design, Tuple-based switching (as opposed to destination (L2/L3) field based switching), finer flow level control and traffic management (e.g., load balancing and rate shaping), flexible packet manipulation and modification logic to accommodate complex data types and new flow-based and application aware services/technologies, cross multiple networking layers that provide longevity and reusability of technology, and ease of use and simplifications of networking device configurations and management.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A flow-based network switching system, comprising:
  a memory having a flow table that includes a plurality of flow match rules;
  a packet processor coupled to the memory, wherein the packet processor includes:
    a user-programmable flow-based rule storage that includes a plurality of flow-based rules;
    a flow-based handler and session manager that is configured to retrieve transport layer metadata that includes a first transport protocol from a first packet, determine that at least one of the plurality of flow match rules from the flow table is associated with the first transport protocol in the transport layer metadata from the first packet, determine that a first flow session is associated with the first packet, and retrieve at least one of the plurality of flow-based rules from the programmable flow-based rule storage using the first transport protocol in the transport layer metadata from the first packet; and
    a flow-based rule processing engine that is configured to apply the at least one flow-based rule to the first packet.

2. The system of claim 1, wherein the memory further includes:
  a queue that is configured to store packets.

3. The system of claim 1, wherein the flow-based handler and session manager is further configured to:
  retrieve transport layer metadata that includes a second transport protocol from a second packet;
  determine that at least one of the plurality of flow match rules from the flow table is associated with the second transport protocol in the transport layer metadata from the second packet;
  determine that no flow session is available for the second packet; and
  create a second flow session that is associated with the second packet.

4. The system of claim 3, wherein the flow-based handler and session manager is further configured, in response to creating the second flow session, to:
  update the memory for the second flow session.

5. The system of claim 1, wherein the flow-based handler and session manager is further configured to:
  retrieve transport layer metadata that includes a second transport protocol from a second packet;
  determine that none of the plurality of flow match rules from the flow table is associated with the second transport protocol in the transport layer metadata from the second packet; and
  determine that a default rule exists for the second packet, wherein the flow-based rule processing engine is configured to apply the default rule to the second packet.

6. The system of claim 1, wherein the flow-based handler and session manager is further configured to:
  deactivate the first flow session associated with the first packet.

7. The system of claim 1, wherein the at least one flow-based rule includes at least one of a security rule, a load balancing rule, a traffic shaping rule, a redirection rule, a modification rule, a statistical rule, and a packet header rewrite rule.

8. An information handling system (IHS) network, comprising:
  a first IHS that is configured to generate and send a plurality of packets over a network;
  a second IHS coupled to the first IHS through the network, wherein the second IHS is configured to:
    assemble a first set of packets received from the first IHS;
    retrieve transport layer metadata that includes a first transport protocol from each of the first set of packets;
    determine that at least one flow match rule is associated with the first transport protocol in the transport layer metadata retrieved from each packet of the first set of packets using;
    determine that a first flow session is associated with each packet of the first set of packets; and
    retrieve and apply at least one flow-based rule for each packet of the first set of packets using the first transport protocol in the transport layer metadata retrieved from that packet.

9. The IHS of claim 8, wherein the second IHS further includes:
  a memory including:
    a flow table for use by the second IHS in determining the first flow session is associated with each packet of the first set of packets using the first transport protocol in the transport layer metadata retrieved from that packet; and
    a queue that is configured to store the first set of packets received from the first IHS.

10. The IHS of claim 8, wherein the second IHS is further configured to:
  assemble a second packet received from a third IHS;
  retrieve transport layer metadata that includes a second transport protocol from the second packet;
  determine that at least one flow match rule is associated with the second transport protocol in the transport layer metadata from the second packet;
  determine that no flow session is associated with the second packet; and
  create a second flow session that is associated with the second packet.

11. The IHS of claim 10, wherein the second IHS is further configured, in response to creating the second flow session, to:
  update a memory for the second flow session.

12. The IHS of claim 8, wherein the second IHS is further configured to:
  assemble a second packet received from a third IHS;
  retrieve transport layer metadata that includes a second transport protocol from the second packet;
  determine that no flow match rules are associated with the second transport protocol in the transport layer metadata from the second packet;
  retrieve and apply a default rule to the second packet.

13. The IHS of claim 8, wherein the second IHS is further configured to:
  deactivate the first flow session associated with the first set of packets.

14. The IHS of claim 8, wherein the at least one flow-based rule includes at least one of a security rule, a load balancing rule, a traffic shaping rule, a redirection rule, a modification rule, a statistical rule, and a packet header rewrite rule.

15. A method for network switching, comprising:
assembling a first set of packets received from a first information handling system (IHS) over a network;
retrieving transport layer metadata that includes a first transport protocol from each of the first set of packets;
determining that at least one flow match rule is associated with the first transport protocol in the transport layer metadata retrieved from each packet of the first set of packets using;
determining that a first flow session is associated with each packet of the first set of packets;
retrieving and applying at least one flow-based rule for each packet of the first set of packets using the first transport protocol in the transport layer metadata retrieved from that packet; and
forwarding each packet of the first set of packets.

16. The method of claim 15, further comprising:
assembling a second packet received from a second IHS;
retrieving transport layer metadata that includes a second transport protocol from the second packet;
determining that at least one flow match rule is associated with the second transport protocol in the transport layer metadata from the second packet;
determining that no flow session is associated with the second packet; and
creating a second flow session that is associated with the second packet.

17. The method of claim 16, further comprising:
updating a memory for the second flow session.

18. the method of claim 15, further comprising:
assembling a second packet received from a third IHS;
retrieving transport layer metadata that includes a second transport protocol from the second packet;
determining that no flow-based rules are associated with the second transport protocol in the transport layer metadata from the second packet; and
retrieving and applying a default rule to the second packet.

19. The method of claim 15, further comprising:
deactivating the first flow session associated with the first set of packets.

20. The method of claim 15, wherein the at least one flow-based rule includes at least one of a security rule, a load balancing rule, a traffic shaping rule, a redirection rule, a modification rule, a statistical rule, and a packet header rewrite rule.

* * * * *